United States Patent

[11] 3,580,050

| [72] | Inventor | Paul H. R. Waldron |
| | | 175 Jupiter Point Road, Groton, Conn. 06340 |
| [21] | Appl. No. | 825,856 |
| [22] | Filed | May 19, 1969 |
| [45] | Patented | May 25, 1971 |

[54] TESTING DEVICE FOR STRETCHABLE SHEET MATERIALS UNDER SIMULTANEOUS DISTORTION IN THREE DIMENSIONS
13 Claims, 14 Drawing Figs.

| [52] | U.S. Cl. | 73/37, 73/102 |
| [51] | Int. Cl. | G01m 3/02 |
| [50] | Field of Search | 73/37, 102 |

[56] References Cited
UNITED STATES PATENTS

| 2,469,013 | 5/1949 | Sobota | 73/102UX |
| 2,826,910 | 3/1958 | Bell et al. | 73/102X |

FOREIGN PATENTS

| 1,149,922 | 6/1963 | Germany | 73/102 |

Primary Examiner—Louis R. Prince
Assistant Examiner—William A. Henry, II
Attorney—James D. Bock ABSTRACT: Apparatus for testing stretch, recovery and hysteresis characteristics of fabrics particularly useful for elastic fabrics of type used in foundation garments and brassieres, including multidirectionally stretchable isotropic or nonisotropic fabrics. Test sample is secured against an elastomeric diaphragm which is progressively inflated to distort sample in three dimensions while measuring volumetric change in relation to force applied. Device also plots relationship of force to dimension change in sample in any desired direction or directions. Both volumetric and dimensional changes are also plotted to show recovery characteristics of fabric during deflation of diaphragm. Repeated tests on same sample show hysteresis characteristics thereof. Device also useful with paper, felts or other sheet material to test stretch and/or bagging and/or bursting characteristics.

Patented May 25, 1971
3,580,050
8 Sheets-Sheet 2
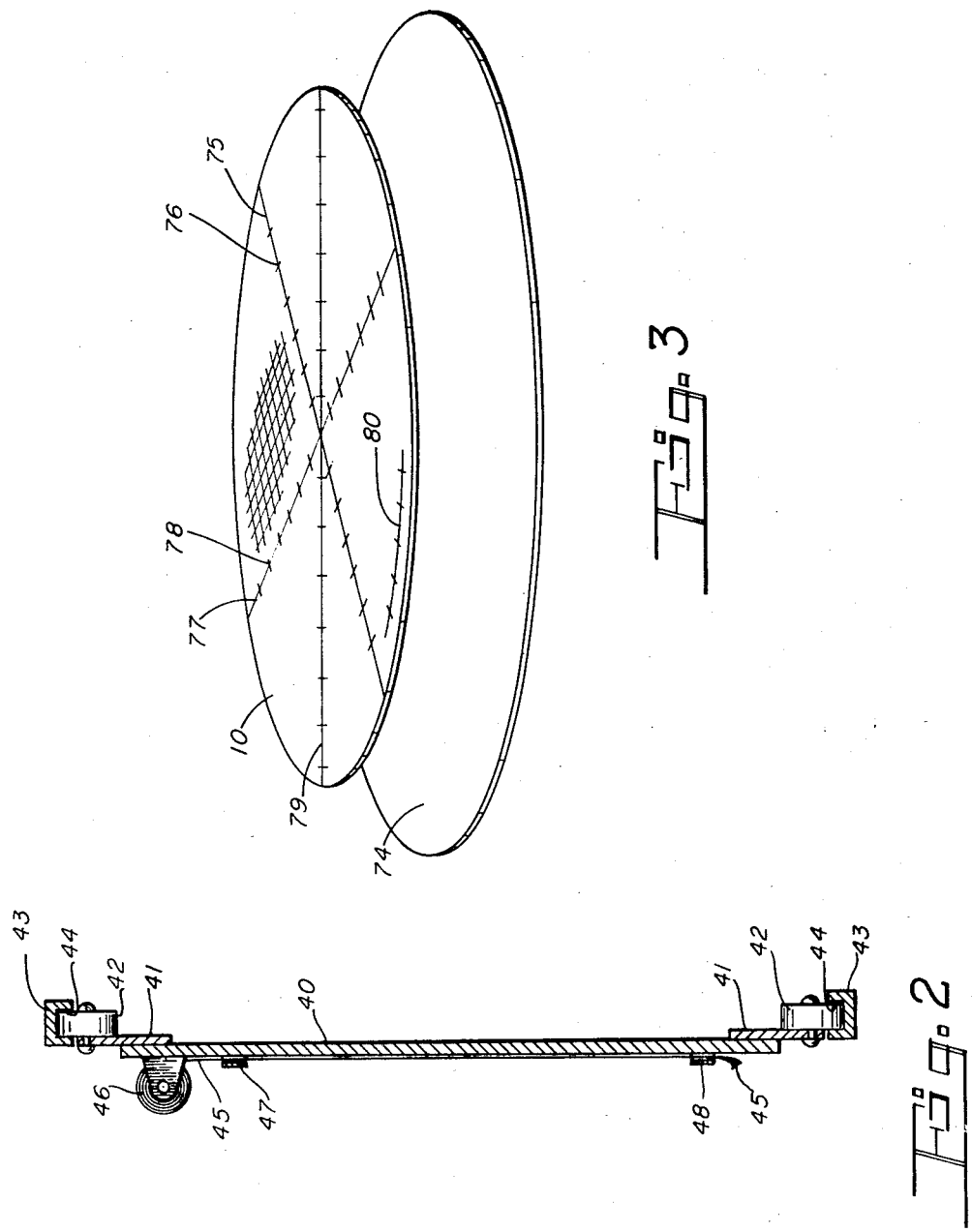

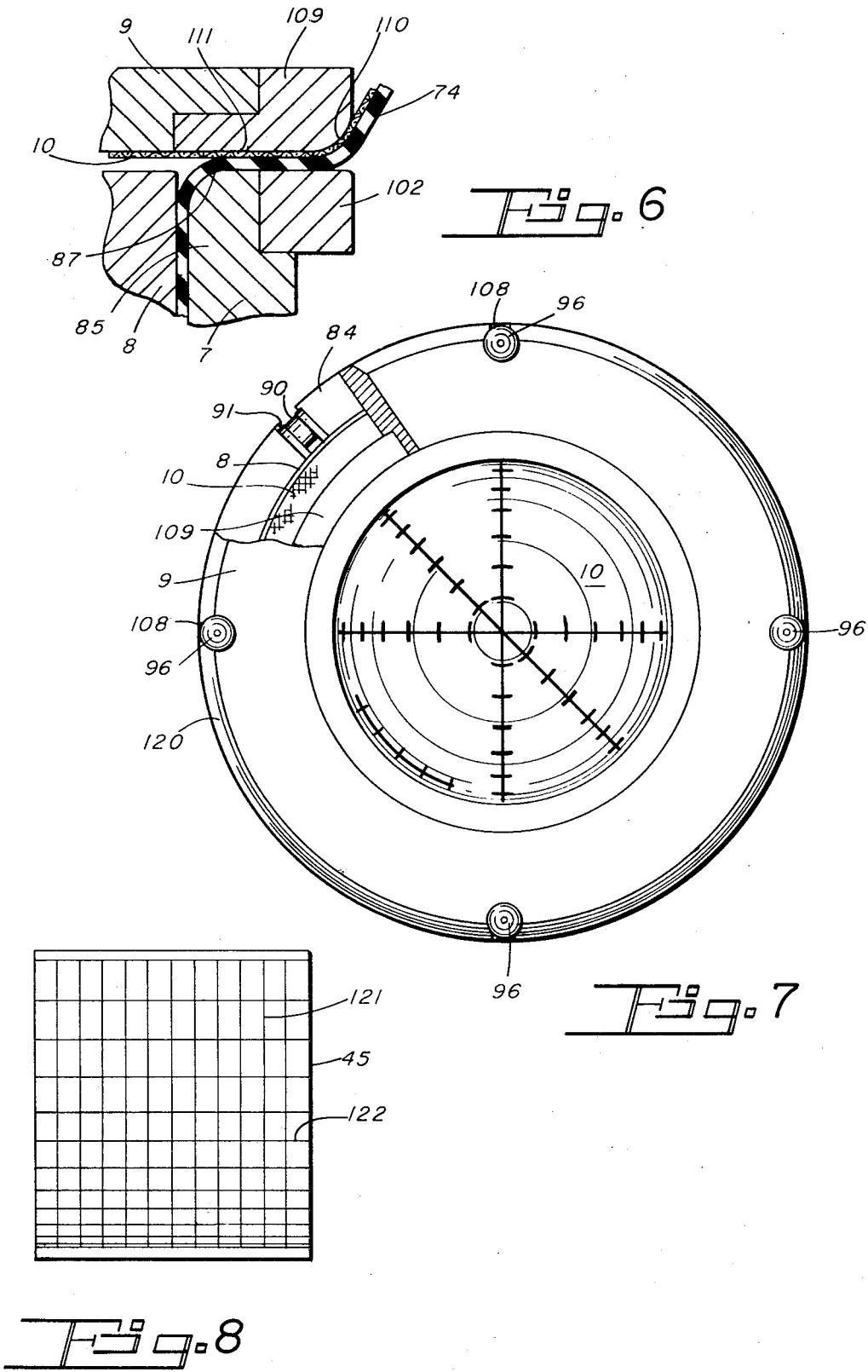

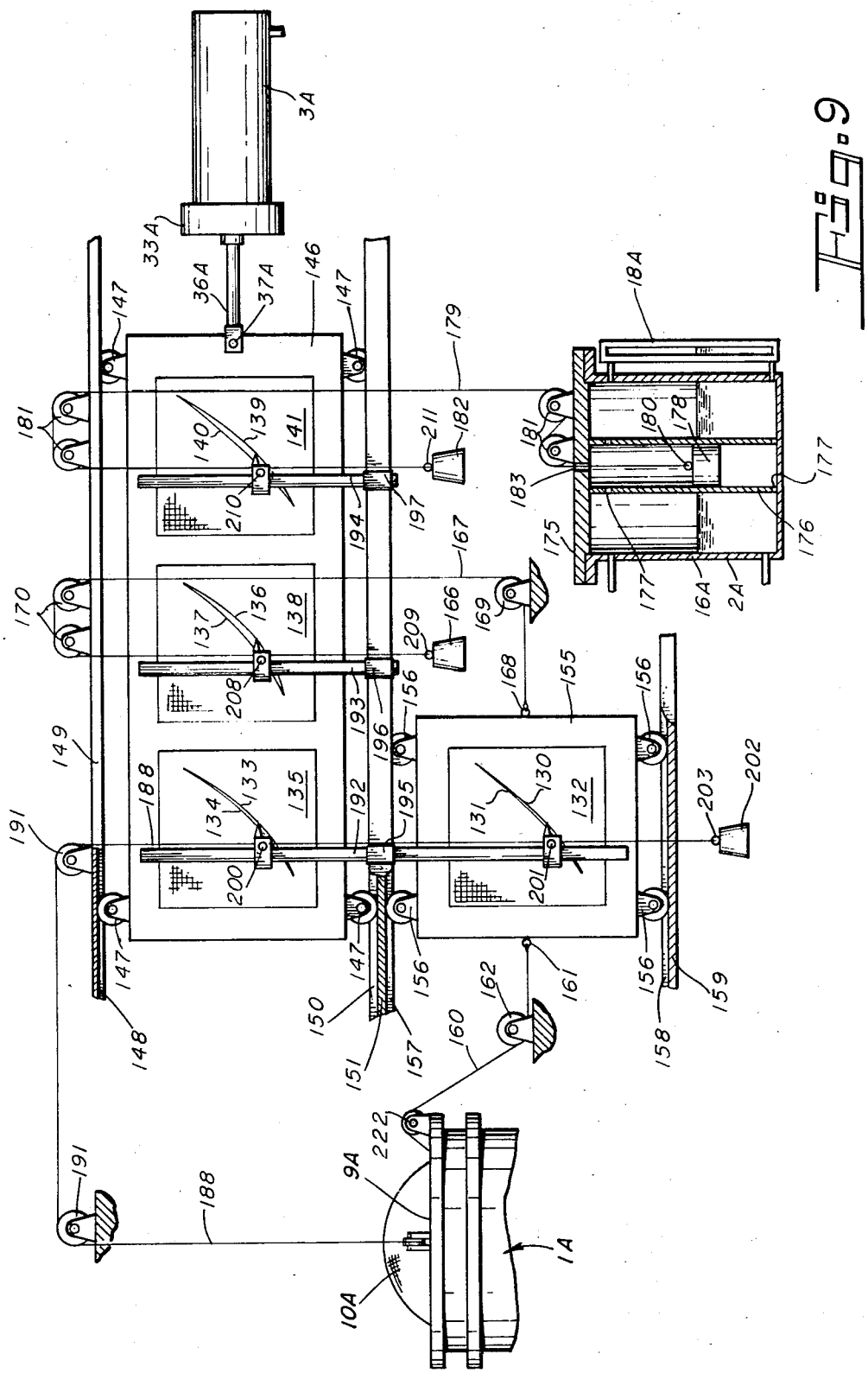

Patented May 25, 1971  3,580,050

TESTING DEVICE FOR STRETCHABLE SHEET MATERIALS UNDER SIMULTANEOUS DISTORTION IN THREE DIMENSIONS

Elastic fabrics of the type used for many years for round garters and sleeve holders have substantial stretch and recovery in one direction and very little stretch in the other direction. Devices were devised many years ago for the testing of such elastic fabrics. The presently widely used two-way stretch or "power net" fabrics are stretchable in at least two directions, that is, in the warp direction or in the weft direction (the latter being called the "side direction" in this particular industry). The degree of stretchability may vary widely as between the two directions all the way from an isotropic (or square) fabric to one wherein the stretch in one direction is only a small fraction of that available in the other direction. To a great extent the testing of these modern multidirectionally stretchable fabrics is still being carried out on apparatus originally designed for one-way stretch fabrics. Thus the amount by which a fabric will stretch under a selected applied load is checked first in one direction and then in the other direction when two-way stretch fabrics are under test. Testing of this sort does not give adequate indication to the behavior of a two-way fabric when subjected to a force tending to stretch the fabric in both directions which represents the conditions that the fabrics meet in use in girdles, foundation garments, brassieres and the like.

The present invention provides a testing device in which multidirectionally stretchable sheet materials, including nonporous materials as well as porous materials such as fabrics of the type used in the foundation garment industry, may be tested under conditions more closely approaching the conditions met by the material in use. A porous fabric sample is held against an elastomeric diaphragm which is sealed across the open end of a container whereas a nonporous material may be tested without such a diaphragm. Fluid pressure is applied to the container to inflate the diaphragm and/or the sample and thus to cause the sample to be distorted in three dimensions, that is, it bulges outwardly and the sample is stretched in all directions including the warp direction and side direction in fabrics. The volume of fluid pumped into the container is utilized as a measure of the volume of inflation and the pressure which the fluid must exert to achieve a given volume of inflation serves as a measure of the amount of force required to distort the fabric sample to a particular degree in all directions. In the case of an isotropic or square fabric the diaphragm will inflate into a shape substantially comprising a segment of a sphere. When the fabric has different stretch characteristics in various directions inflation of the diaphragm will distort the fabric into oblate configurations, the particular shapes of which serve to indicate the relationships between stretch characteristics in the various directions.

The sample to be tested may be marked with appropriate evenly-spaced markings prior to test and the change in spacing between the markings as a result of distortion may be recorded to indicate the stretch characteristics of the fabric in various directions. Preferably however the apparatus includes recording equipment arranged to draw meaningful curves based upon the plotting of at least one factor against at least one other factor. In its simplest form the recording device plots volume of inflation against the force required to achieve such inflation. In more sophisticated forms of the apparatus disclosed herein the amount of elongation of the yarn in at least two directions is plotted against the force required to produce such elongation and the amounts of elongation of both sets of yarns are plotted against one another. In a still further modification of the invention of particular shape assumed by the sample inflated under standard conditions is displayed by profilometer. The display may be on a chart having standard profiles drawn thereon for comparative purposes. The shape may be compared along several axes if so desired. Alternatively, profiles of the inflated sample may be drawn or photographed for record purposes.

It is an object of the present invention to provide testing apparatus of the type discussed above. Other and further objects will become apparent from the following description of preferred forms of the invention.

Referring now to the drawings:

FIG. 2 is a vertical sectional view taken along the line 2–2 in FIG. 1;

FIG. 3 is an exploded view of an elastomeric diaphragm and a fabric sample illustrating various types of markings that might be placed upon the fabric prior to the testing thereof;

FIG. 6 is an enlarged fragmentary view showing the relationship between the elastomeric diaphragm and the test sample in the condition illustrated in FIG. 5;

FIG. 7 is a plan view with parts broken away of the testing chamber with sample in place;

FIG. 8 is an elevational view of a specially printed recording paper designed for use in the apparatus shown in FIGS. 1 and 2;

FIG. 9 is a view similar to FIG. 1 but showing a modified form of apparatus embodying the present invention;

Figure 1:
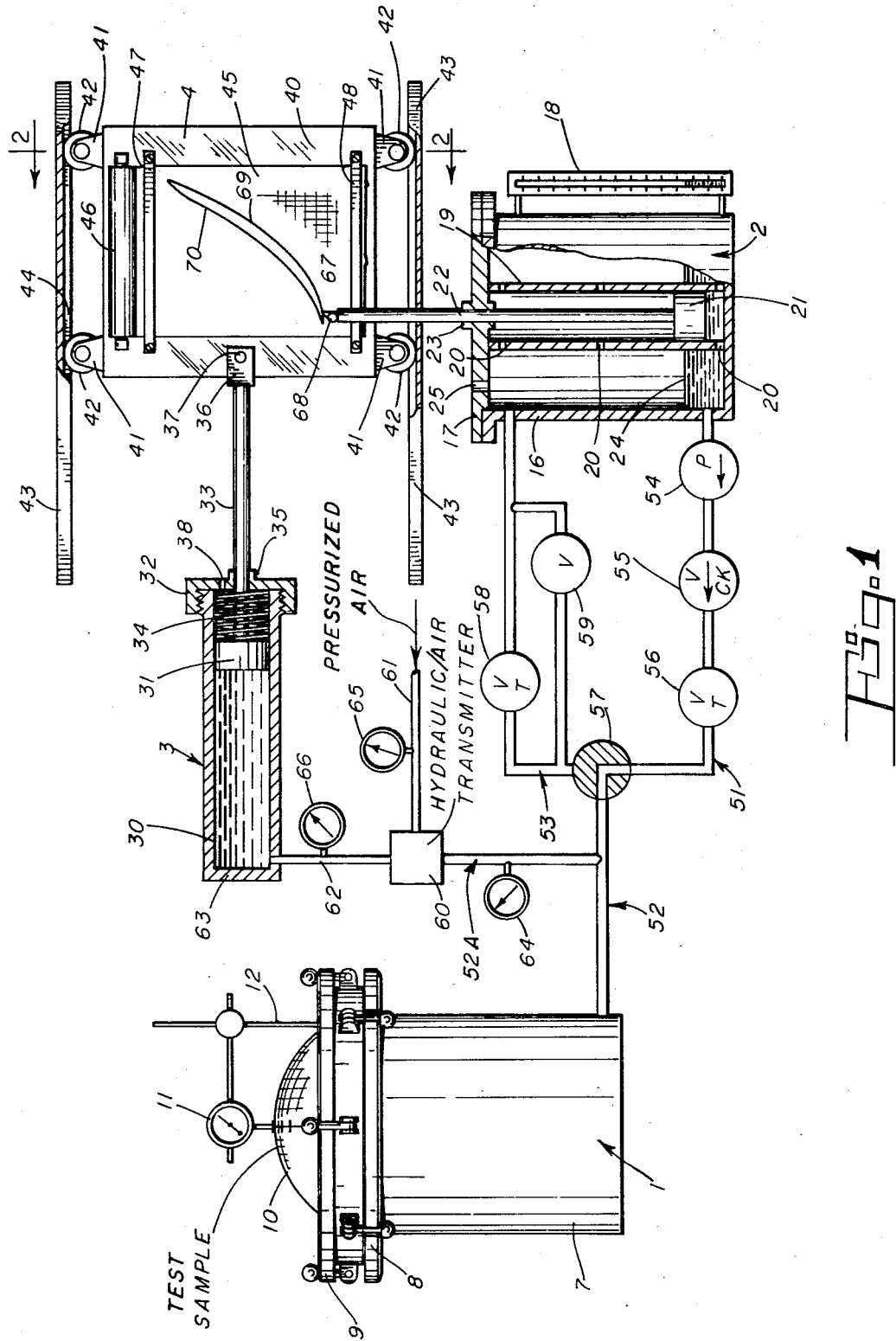
FIG. 1 is a diagrammatic elevational view, with parts in section, of one form of apparatus embodying the present invention.

In the drawings FIG. 1 illustrates, in part diagrammatically, the general arrangements of the invention. It comprises a testing chamber 1, reservoir 2, cylinder assembly 3 and recording device 4 which, operating in combination, serve to test the qualities of elastic fabrics or other sheet material, generally referred to herein as "fabrics" under conditions which are closely related with the conditions encountered in normal use of such fabrics. The testing chamber 1 comprises, in this embodiment, chamber 7, diaphragm clamp ring 8, sample clamp ring 9 for holding a fabric sample 10, and dial micrometer 11 on a support 12 so mounted as to be fixed with respect to the sample clamp ring 9.

Reservoir 2 comprises a fluid chamber 16 fitted with a vented cover 17, a gauge glass 18, and an internal float guide cylinder 19, free-flooding by means of perforations 20 and containing a weighted float 21 to which is attached float extension 22 moving vertically thru extension guide bearing 23. As the level of fluid 24 which maybe water, rises falls float 21 and float extension 22 rise or fall in concordance. The cover 17 may be vented by means such as a vent channel 25.

Actuation cylinder assembly 3 comprises a cylinder 30, piston 31, removable vented cap 32, piston extension 33 and a calibrated resistance and return spring 34. Extension 33 may be guided by means of guide-bearings area 35 in cap 32. Extension 33 is attached conveniently to recording device 4 by means of a clevis 36 and clevis pin 37. The calibrated spring 34 may be changed as desired to accommodate varieties of fabrics being tested, or varieties of tests being performed. The cap 32 may be vented by means such as a vent channel 38.

The recording device 4 (see FIGS. 1 and 2) comprises a platen 40 which is a rigid plate slidably supported by means of upper and lower brackets 41 and rollers 42, which are in turn supported by means of upper and lower fixed grooved guides 43 wherein rollers 42 are free to move laterally within grooves 44 in response to movements of the actuator cylinder assembly 3. The recording device 4 is arranged to support recording paper 45 upon the platen 40. The recording paper, for convenience, is supplied in the form of a roll 46 which is mounted upon the platen 40. The recording paper 45 is passed under an upper retaining strip 47 and lower retaining s trip 48, the latter also acting as a "tear-off" device permitting the removal of recorded sections. Preferably, the recording paper 45 is especially printed to present successive forms unequally divided as will be described below in connection with FIG. 8.

The testing chamber 1, reservoir 2 and actuating cylinder 3 are connected for operation by means of a system of piping and valves, etc. In this embodiment of my invention such connections include, generally, fluid supply piping 51, supply and return piping 52, pressure sensing piping 52A and return piping 53. The supply piping 51 extends from the lower portion of the fluid chamber body 16 to a pump 54, check valve 55 and metering valve 56 to a two-way valve 57. In the position in which two-way valve 57 is shown fluid will be pumped at a rate controlled by valve 56 to the piping 52 which leads to the lower portion of the test chamber 1. When two-way valve 57 is turned 90° clockwise it will close off supply piping 51 and will connect the piping 52 and test chamber 1 with the return piping 53 which is connected through a return metering valve 58, with bypass valve 59 to the upper portion of the fluid chamber body 16. Thus, when bypass valve 59 is closed fluid may be returned from the test chamber 1 to the reservoir 2 at a rate controlled by metering valve 58. When bypass valve 59 is opened the fluid may be returned rapidly at a generally uncontrolled rate.

The pressure responsive piping 52A is permanently opened into piping 52 and thus constantly communicates with the interior of the testing chamber 1. The piping 52A extends to hydraulic/air pressure transmitter 60 in which by means of bellows, diaphragms or the like (not shown) the changes in fluid or hydraulic pressure in piping 52A are used to modulate the pressure of air introduced into the transmitter 60 through a supply pipe 61 connected with a source (not shown) of air under regulated pressure. The air under pressure as modulated by the transmitter 60 is conducted through piping 62 to the interior of the actuating cylinder 3. Instantaneous displays of fluid pressure in line 52A and air pressure in lines 61 and 62 are made on pressure gauges 64, 65 and 66 respectively.

In operation, valve 57 is positioned to permit flow into testing chamber 1, and pump 54 supplies fluid to the chamber. As fluid is removed from reservoir 2, the level of fluid 24 moves downwardly and as pressure in chamber 1 increases, the actuating piston 31 moves to the right (in FIG. 1), moving recording device 4 in that direction. Attached to the upper end 67 of float extension 22 is a marking device 68, continually in contact with recording paper 45 on platen 40. As pressure increases, the fabric sample 10 under test expands as it would in service as a brassiere or other foundation garment, and marker 68 moves downwardly with the float 21 thus responding to the change in level and volume of fluid 24 in the reservoir 2. The combination of movements of recorder device 4 and marker 68 produces on paper 45 a curve 69, readily interpreted by those versed in the art to reveal the qualities of test sample 10. A second significant curve 70 may be obtained by shifting two-way valve 57 to exhaust from supply and return piping 5 to return piping 53, with bypass stop valve 59 closed so that the fluid exhausts thru return metering valve 58 as the test sample 10 contracts or returns from its expanded condition. In this mode, of course, piston 31 moves to the left (in FIG. 1) due to lessening pressure in cylinder interior 63 and the stored energy of calibrated spring 34. Piston extension 33 thus acts to move recording assembly 4 to the left, and marker 68 moves upwardly as float 21 moves similarly due to the rise of fluid level 24.

FIG. 3 shows the relationship between test sample 10 and an elastomeric diaphragm 74. The latter may be made from rubber or some similar airtight material having known elastic characteristics which, for example, may be determined by testing such diaphragm along on the present apparatus. For purposes of mensuration during test, sample 10, is marked with a diametral line 75 in, say, the direction of the warp of the fabric with regular graduation marks 76. Further, the sample may be marked by a second diametral line 77 at right angles to line 75 in the direction of the side stretch of the fabric, with regular graduation marks 78. In addition a multiplicity of graduated lines such as diametral line 79 and peripheral line 80 may be added to the sample as may be deemed necessary. It will be noted in this FIG. 3, that the diameter of the diaphragm 74 in the relaxed condition therein represented in substantially greater than the diameter of the test sample 10.

Figure 4:
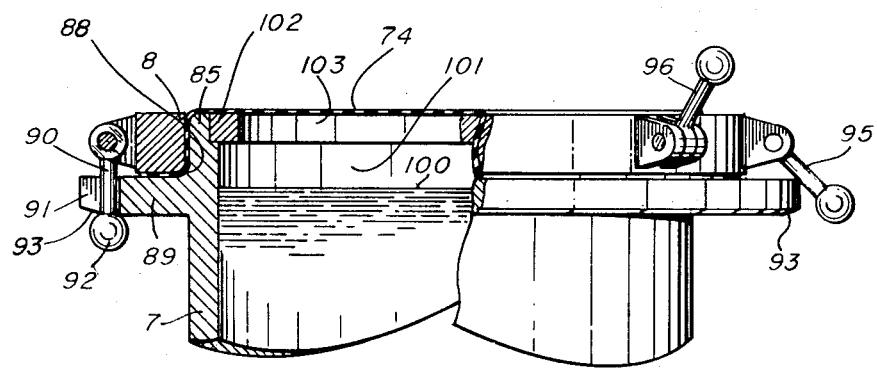
FIG. 4 is a fragmentary vertical sectional view showing the testing chamber with elastomeric diaphragm sealed across the open mouth thereof.
Figure 5:
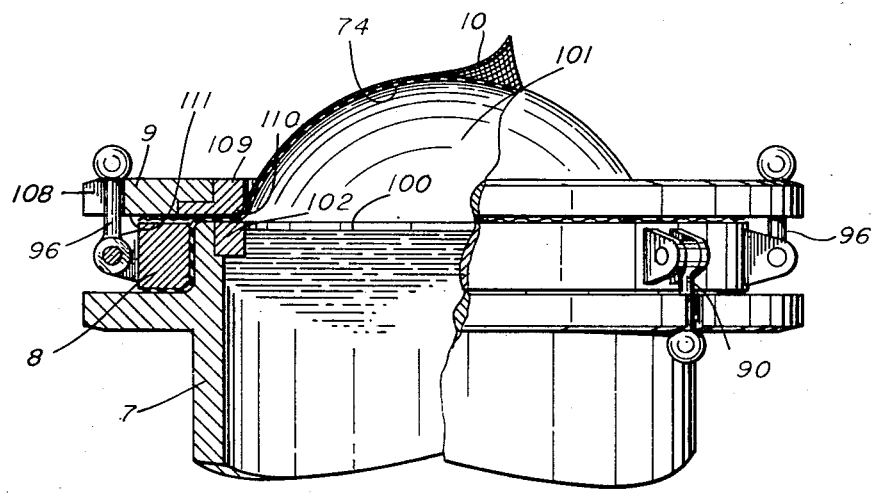
FIG. 5 is a view similar to FIG. 4 but showing one manner of center test sample against the elastomeric diaphragm collars also showing the diaphragm and test sample in an inflated condition.

Referring now to FIGS. 4 and 5 the diaphragm 74 is shown clamped in place over the rim 85 of the mouth of chamber cylinder 7 and under the clamping ring 8. The diaphragm is led easily over rounded outer edge 87 (see FIG. 6) of the rim 85 of cylinder 7 and under the correspondingly rounded edge 88 of ring 8. The clamping ring 8 is secured to cylinder flange 89 by means of a wedged dog assembly 90 which is operated by forcing dog assembly 90 into slot 91 in flange 89 so that spherical doghead 92 moves downwardly across beveled under surface 93 of rim 89 and comes to rest at locking point. The dog assembly 95, shown to the right of FIG. 4 is identical with assembly 90 but is shown about to enter a slot identical with slot 91. The level of fluid 100 is shown at the position prior to testing with a predetermined volume of air 101 between it and diaphragm 74 to perform the test. An insert rig 102 selected from a ground of rings having varying inner diameters 103 establishes the particular diameter desired for the testing of a particular fabric sample.

In FIG. 5 the cylinder 7 has been turned slightly about its vertical axis so as to show the wedged dog clamping assemblies 90 off the section line and thus to show the clamping arrangements for holding the sample 10 in test position. Thus, the cover clamp ring 9 is secured to ring 8 and cylinder 7 by means of a plurality of cover clamp dog assemblies one of which is shown in place in slot 108. A cover insert ring 109 is designed to match the cylinder insert rig 102 and is designed in this embodiment with a lower, inner edge 110 (see FIG. 6) rounded to accommodate the test sample 10. Test sample 10 is clamped between the lower surface 111 of cover insert 109 and the upper horizontal surface of edge 85 of chamber cylinder 7. The dog assemblies 96 come to rest at locking points in a manner similar to that of the dog assemblies 90 as described in connection with FIG. 4.

In FIG. 5 the level of the liquid 100 is shown in a position which it assumes when the diaphragm 74 and test sample 10 have been inflated for testing of the sample 10. The air 101 has been compressed and displaced upwardly by the fluid 100 as the latter is pumped into the test chamber 1. Preferably, the fluid 100 does not come into contact with the inner surface of diaphragm 74 for practical reasons which will be discussed below. As shown in FIG. 5 and in enlarged detail of FIG. 6 the smoothly rounded surface 110 of insert ring 109 prevents undue concentration of stresses in the zone in which the fabric test sample 10 and diaphragm 74 must flex upwardly when inflated. It will be understood that there will be a zone, circular in shape, in which the test sample 10 undergoes transition from the clamped innovable condition existing between the flat mating surfaces of rings 109 and 102 to the condition of freedom to stretch in all directions. When the end use for a particular fabric requires a comparable transition the test samples of such fabric may be circumferentially marked as indicated by the graduated line 80 in FIG. 3. Observation of such line 80 in conjunction with observation of other lines, such as the various diametral lines 75, 77, 79 in FIG. 3, will enable one to assess the behavior of the fabric under test in such transition zone.

In FIG. 7, in addition to showing the relationship, in a plan view, of the various clamping and other parts already described, also shows a test sample 10 in place and inflated. This showing is intended only to illustrate how the changes in graduation spacing on the various lines 75, 77, 79 and 80 may be observed for assessment of a fabric sample in relation with the pressure and volume information recorded on paper 45 (FIG. 1) on the recording device 4.

Referring again to FIGS. 4 and 5 it will be recalled that a certain volume of air 101 is enclosed between the upper surface of fluid 100 and the inner surface of he diaphragm 74. In view of the face that air is readily compressible it will be appreciated that the volume of air 101 will be progressively reduced as the level of fluid 100 is raised from the position shown in FIG. 5. However since the compression of air follows well known laws it is only essential, for the purpose of the present invention, to known what volume of air is included in the space above the fluid 100 under atmospheric pressure when the fluid 100 is at the level shown in FIG. 4. By utilizing the gauge glass 18 on reservoir 2 (FIG. 1) the level of fluid 24 under atmospheric pressure in the reservoir may be adjusted by addition or removal of fluid 24 to establish the proper level for fluid in both reservoir 2 and chamber as a preliminary to setting the apparatus up for operation on a particular type of fabric.

Since, as explained above, the level of the fluid 24 in reservoir 2 is used as a measure of he volumetric expansion of the test sample 10 and diaphragm 74, the compressibility of the air 101 must be taken into account. Thus, one simple manner of taking the behavior of air into account is illustrated in FIG. 8 wherein a specially printed recording paper 45 is shown. The vertical lines 121 printed on paper 45 are equally spaced from left to right. This is because the horizontal movement of platen 40 is linearly related to changes in pressure in the test chamber 1. The horizontal lines 122, which represent equal increments of volume, are progressively more closely spaced toward the bottom of the sheet 45. The progressive change in spacing is related with the progressively decreasing volume of the trapped air 101 as it compresses under increasing pressure. Referring briefly back to FIG. 1 it will be noted that the level of fluid 24 in reservoir 2 drops as an incident to pumping of fluid from the reservoir 2 to the test chamber 1 and the platen 40 moves toward the right as pressure increases. Accordingly the curve drawn upon paper 45 on the recording device 4 is oriented downwardly to record volume and toward the left to record pressure as pressure increases on the fabric sample under test. This is an inversion of the more familiar custom of drawing curves from left towards to right and from bottom towards the top of a sheet of paper to record increasing values. HOwever, such curves may be interpreted by person familiar with the machine while the machine is in operation. When a test is completed and the sheet of paper 45 is torn off the platen 40 to sheet 45 may be inverted for the convenience of persons not accustomed to reading inverted curves.

Another embodiment of my invention is shown in FIG. 9 wherein means are provided to record four curves simultaneously as a fabric sample is inflated for testing. Thus, change in length in side direction is plotted versus change in length in warp direction as shown in curves 130 and 131 upon chart 132. Change of length in side direction is plotted versus force required to expand the sample as shown in curves 133 and 134 upon chart 135. Change in length in warp direction is plotted versus force as shown in curves 136 and 137 upon chart 138. Volume is plotted versus force as shown in curves 139 and 140 upon chart 141. It will be appreciated that insofar as the information they convey is concerned curves 139 and 140 are the same as curves 69 and 70 in FIG. 1 but the direction in which curves 139 and 140 trend in inverted so as to shown rising volume and pressure in a curve which trends upwardly and to the right as observed on the platen. In FIG. 9 an upper platen 146 upon which are mounted charts 135, 138 and 141 is rollably supported and guided by roller assemblies 147, two of which are guided within channel 148 of upper rail 149 and two of which are guided within upper channel 150 of center rail 151. The movement of said platen 146 in FIG. 9 is effected by the operation of a cylinder assembly 3A identical with cylinder assembly 3 shown in FIG. 1. However the cylinder assembly 3A is mounted to the right-hand side of the platen in FIG. 9 so that motion from right to left is accomplished by pressurizing the cylinder assembly while motion from left to right is accomplished by depressurizing the cylinder assembly and utilizing the work stored in the internal spring. Reference is made to FIG. 1 for a full showing of those parts of the cylinder assembly 3A which are not shown and identified by corresponding reference numbers in FIG. 9.

A laten 155 mounted beneath upper platen 146 as shown in FIG. 9 is fitted with roller assemblies 156, two of which are rollably guided in lower channel 157 of center rail 151 and the other to of which are rollably guided within channel 158 of lower rail 159. The movement of lower platen 155 is effected from light to left, in FIG. 9, by means of a warp tension wire 160 attached to platen 155 at at 161 and riding under warp tension wire sheave 162. Warp tension wire 160 works in opposition to a platen return weight 166 supported by means of a recording and return wire 167 attached to platen 155 at 168, and passing under lower warp recording and return sheave 169 and over upper warp recording and return sheaves 170.

In the embodiment o the invention illustrated in FIG. 9, reservoir 2A comprises a fluid chamber 16A fitted with vented cover 175, a gauge glass 18A and an internal float guide cylinder 176, free flooding by means of perforations 177 and containing a weighted float 178 to which is attached at 180 a water level recording wire 179. The wire 179 passes over a series of sheaves 181 on reservoir 2A and on the upper rail 149. Tension in water level recording wire 179 is maintained by means of weight 182. The water level recording wire 179 passes through cover 175 of reservoir 2A by way of an aperture 183 which is substantially larger in diameter than wire 179 and serves also as a vent for the interior of the reservoir 2A. Except for the manner of recording water level, the reservoir 2A in FIG. 9 and reservoir 2 in FIG. 1 are substantially the same and serve the same function within the hydraulic system.

In the embodiment shown in FIG. 9, testing chamber 1A is shown with sample clamp ring 9A in place and sample (under test) 10A in a partially inflated condition. It is the purpose in this embodiment to measure the actual change in length along the line of warp and along the line of side stretch in sample 10A as said sample undergoes test. Thus the warp tension wire 160 described above and a side tension wire 188 are attached to the testing chamber 1A at points 189 and 190 respectively. As sample 10A is expanded under test as described above, warp tension wire 160, passing under warp tension wire sheave 162 and over test sample 10A moves toward the left in FIG. 9, in turn moving platen 155 in the same direction. At the same time, side tension wire 188 moves to the left and downwardly over side tension sheaves 191.

Guide posts 192, 193 and 194 for carrying marking devices are slidably mounted to center rail 155 by means of clamping collars 195, 196 and 197 rigidly attached to center rail 151. It is understood that upper rail 149, center rail 151, lower rail 159, cylinder assembly 3A and test chamber 1A are, with relation to each other, rigidly fixed in space as are all sheaves such as 162, 169, 170 and 191. For example all such fixed parts may be secured to a frame or cabinet structure (not shown). Side tension wire 188 passes over side tension wire sheaves 191 and through an upper side tension marker assembly 200 and a lower side tension marker 201 and is attached to a side tension wire return weight 202 at point 203; both upper side tension marker 200 and lower side tension marker 201 are clamped to side tension wire 188 so that a movement either upward or downward of side tension wire 188 moves both upper and lower side tension markers 200 and 201 producing, in the case of upper side tension marker 200, one component of curves 133 and 134 on chart 135 and in the case of lower side tension marker 201, one component of curves 130 and 131 on chart 132.

As noted above movement of warp tension wire 160 produces horizontal movement of platen 155. This provides the second component for curves 130 and 131 on chart 132. Movement of platen 155 also produces a corresponding movement in a warp recording and return wire 167 which passes under sheave 169 and over sheaves 170 through a warp tension marker 208 and is attached to a platen return weight 166 at point 209. The warp tension marker 208 is slidably mounted upon marker guidepost 193 and is clamped to warp recording and return wire 167 so that any motion of wire 167 results in a motion of marker 208. This motion provides one component of curves 136 and 137 upon chart 138.

A water level recording wire 179 is attached to the weighted float 178 in reservoir 3A at 180 and passes over and under water level recording wire sheaves 181 and thence downwardly through a water level recording marker 210 and is attached to water level recording wire weight 182 at point 211. The water lever recording marker 210 is slidably mounted upon marker guidepost 194 and is clamped to water level recording wire 179 so that any movement of wire 179 produces a movement of marker 210, thus furnishing one component of curves 139 and 140 on chart 141. The second component for curves 133 and 134, 136 and 137 and 139 and 140 is provided by the movement of piston extension 33A as pressure is applied to or released from piston assembly 3A.

Figure 10:
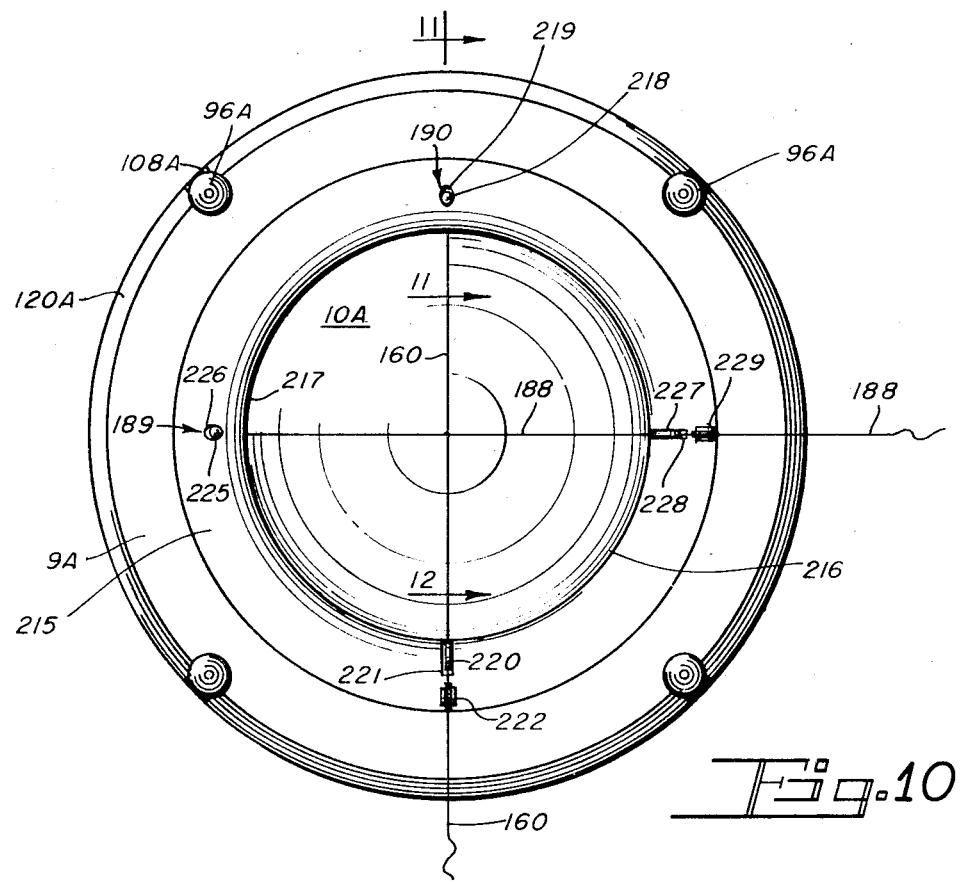
FIG. 10 is a plan view of the testing amber forming a part of the apparatus shown in FIG. 9.

In FIG. 10, lines and graduations such as shown in FIG. 7 have been omitted for clarity of the drawing, it being understood that such lines can be added to the actual sample whether the tension wires are used or not. The cover 9A is provided with a cover insert 215 and is held down by dogs 96A working in slots 108A. The insert 215 has a rounded conformation 216 (See FIG. 11) the purpose of which is to permit the sample 10A to assume a globular shape, the diameter of which can exceed the diameter of the inner surface 217 of insert 215 without damage to either sample 10A or diaphragm 74A. The insert 215 is secured beneath cover 9A in the same manner as insert 109 (FIG. 6) is secured.

Figures 11, 12:
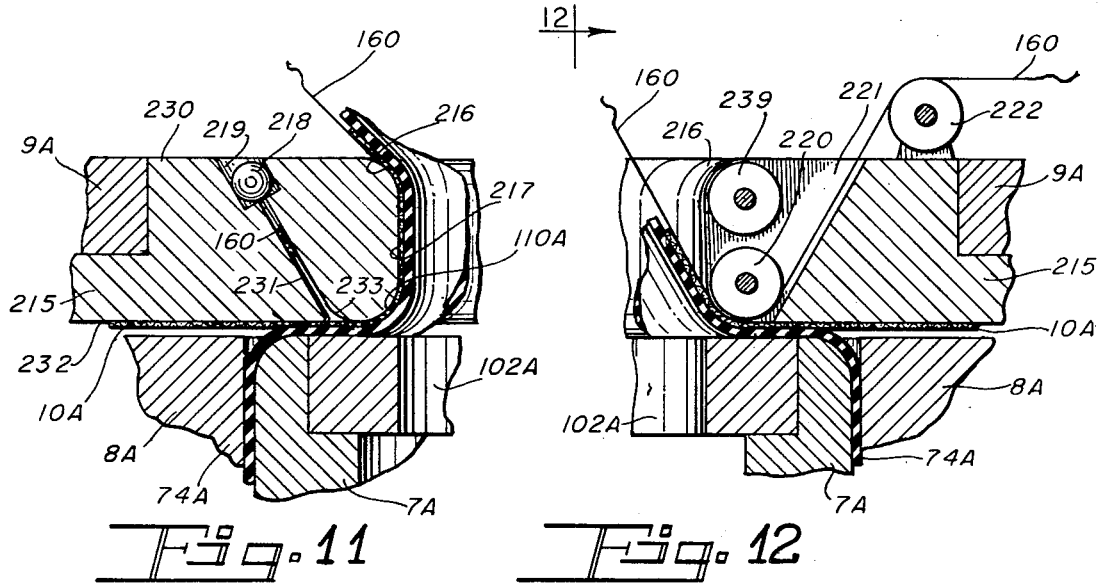
FIGS. 11 and 12 are enlarged fragmentary vertical sectional views taken in the indicated ares of FIG. 10.

Warp tension wire 160 is fitted with a ball or other convenient terminal fitting 218 shown lying within cavity 219 (see also FIG. 11). Wire 160 is led thence beneath the cover insert 215 and over the top of sample 10A diametrically in the direction of the warp of the goods, thence beneath sheave 220 mounted within slot 221 in insert 215 whence it is passed over a pedestal pulley to be guided to pulley 162 as described above in connection with FIG. 9. In like manner, side tension wire 188 is terminated in a ball, or equivalent, fitting 225 resting in ball terminal cavity 226 whence wire 188 is led over the top of test sample 10A, beneath sheave 227 in slot 228 and over a pedestal pulley 228.

FIG. 11 is a partial secton through the upper portion of the testing chamber at the terminal point of warp tension wire 160; the arrangement of the terminal point of side tension wire 188 is identical. The arrangement for clamping the sample 10A and diaphragm 74A in place is the same as that illustrated in FIG. 6. FIG. 11 shows portions of cylinder 7A, clamping ring 8A, cover 9A, and cylinder insert ring 102A. In the upper surface 230 of the cover insert 215 is located the terminal ball cavity 219, and from the bottom of said cavity a hole 231 of substantially smaller diameter, extends through insert 215. The lower portion of hole 231 is faired or rounded as shown in 233 so that wire 160 may be led around it with an easy bend and thence around the rounded lower corner 110A or the bore 217 of insert 215.

In FIG. 12 a lower sheave 220 and upper sheave 238 is shown in a slot 221. Lower sheave 220 is so arranged that its center of rotation coincides with the geometric center of the profile of rounded corner 110A (see FIG. 11), said sheave 220 having a slightly smaller radius than the curve of 110A so that the sheave will not touch sample 10A during test. Sheave 239 is similarly located with respect to the rounded corner 216 (FIG. 11). Wire 160 is led beneath sheave 220 and thence within the slot 221 and over pedestal pulley 222. When testing is carried to the point where the outside diameter of the expanded test piece 10A exceeds the inside diameter of insert 215, warp tension wire 160 is free to ride over upper sheave 239. Side tension wire 188 is arranged and guided in the same way over the sample 10A and under sheaves 228 located in a slot 227 and thence over the pedestal pulley 216.

The wires 160, 179 and 188 are all preferably made of metal or other material substantially nonstretching under the tensions involved in use of this apparatus.

In the embodiments of the invention shown in FIGS. 1 and 9 respectively movement of the platens 45 and 146 in response to changes in pressure in the hydraulic system is accomplished by an air cylinder 3 or 3A controlled by an hydraulic/air transmitter 60 as shown in FIG. 1. It will be apparent that other, equivalent means may be utilized for this purpose. For example, in FIG. 13 there is illustrated a transducer means for producing linear movement of the platen in response to changes in pressure in the hydraulic system.

Figure 13:
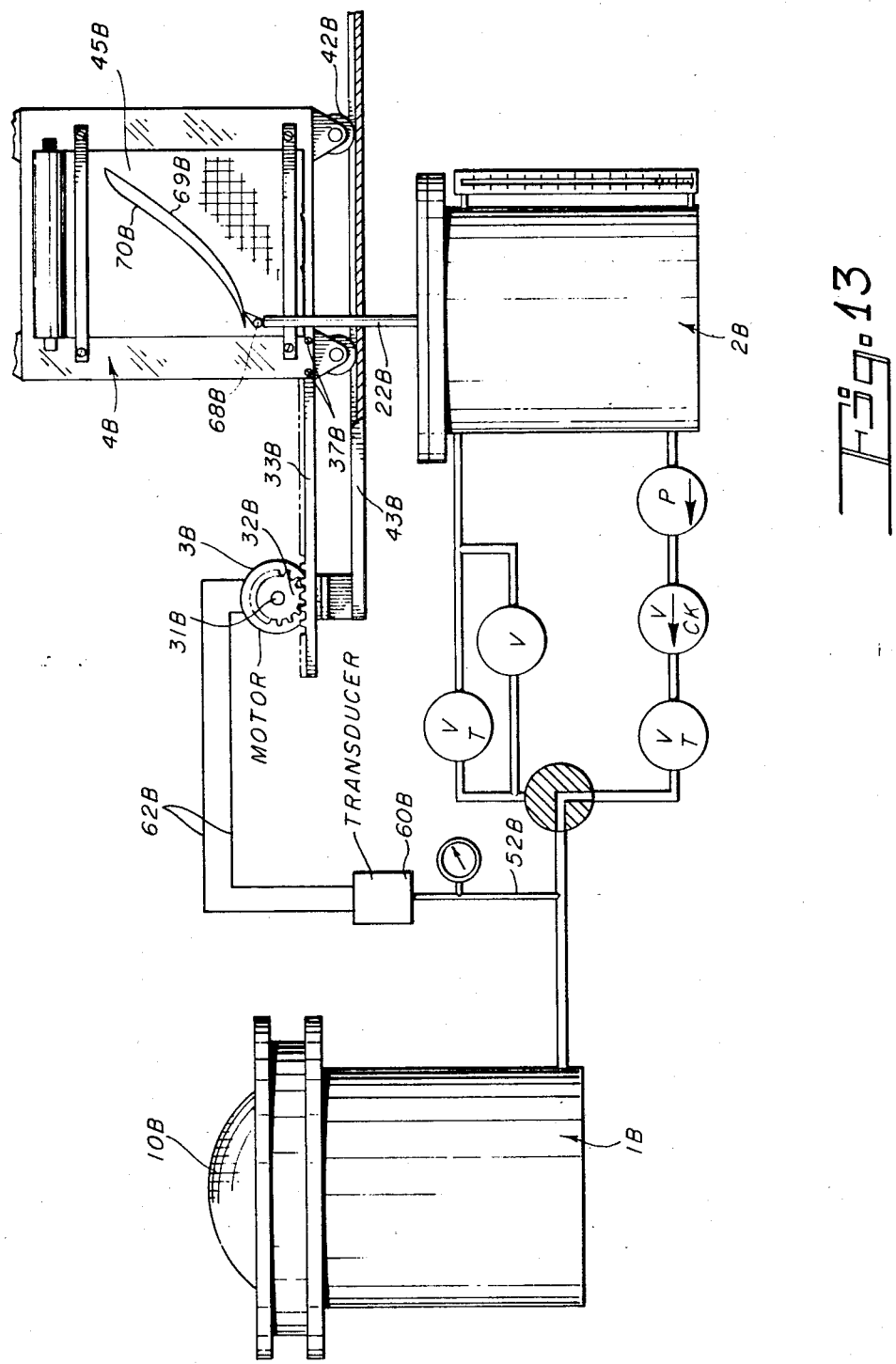
FIG. 13 is a view similar to FIG. 1 showing a still further modification of apparatus embodying the present invention.

In FIG. 13 a transducer means is shown as adapted to a testing device otherwise identical with that shown in FIG. 1. It will be apparent that such transducer means is equally adaptable to the modified testing device illustrated in FIG. 9. In FIG. 13 the testing device includes a test chamber 1B, a reservoir 2B and a recording device 4B all of which may be identical with the corresponding elements 1, 2 and 4 as described in connection with FIG. 1. Also, in FIG. 13 the reservoir 2B is hydraulically connected with test chamber 1B by pumping, piping and valve means all as described in connection with FIG. 1. However, in FIG. 13 pressure responsive piping 52B is connected with an hydraulic/electrical transducer device 60B which produces an electrical signal related in known manner to changes in hydraulic pressure in piping 52B. The device 60B is connected through suitable electrical wiring 62B with a platen drive motor 3B having a drive shaft 31B to which is secured a pinion 32B meshing with the teeth of a rack 33B fixed by screws 37B to the recording device 4B. A change in pressure sensed by the device 60B causes rotation of the motor 3B, the amount or total degrees of angle of rotation being proportional to the change in pressure. Such rotation of motor shaft 31B and pinion 32B thus causes a movement of the recording device 4B which is proportional to said change in pressure. Such movement produces one component of curves 70B and 69B drawn on chart paper 45B, by marker 68B, the other component being supplied by the vertical movement of the float extension 22B of reservoir 2B, as described above in connection with FIG. 1.

In FIG. 13, as in FIG. 1, the recording device 4B is carried on rollers 42B which ride in a rail 43B, the latter being fixed against movement relative to the reservoir 2B.

Figure 14:
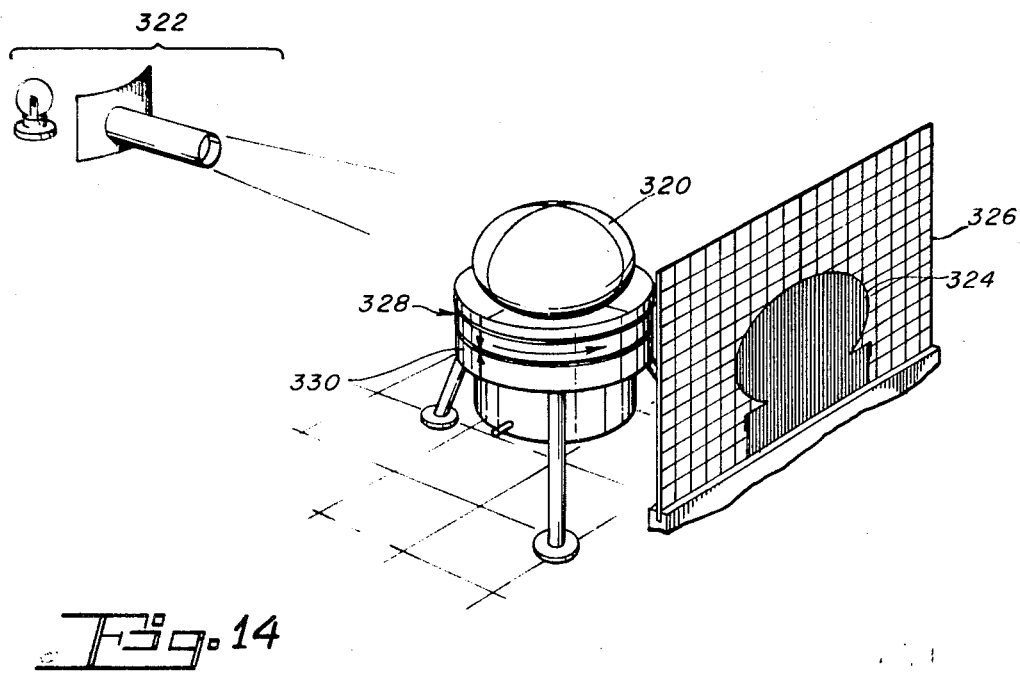
FIG. 14 is a diagrammatic isometric view of an apparatus for presenting an optical display of the shape of an inflated test sample under test on the device of the present invention.

In FIG. 14 there is shown a further modification of the invention which may be used in conjunction with a reservoir and test chamber of the types shown in FIG. 1, FIG. 9 or FIG. 13, with or without the recording devices shown in said FIGS. 1, 9 or 13. In FIG. 14 a test chamber which is functionally identical with chamber 1 in FIG. 1, for example, is shown at 328 and is mounted for rotation about a vertical within a support ring 330. In this modification the test chamber 328 does not have the wedged dog clamping devices 90 and 96 shown in FIGS. 4 and 5 but rather may have an electromagnet built into the upper portion of the chamber so as to clamp the diaphragm and sample by magnetic forces exerted upon rings otherwise similar to rings 8 and 9 as shown in said FIGS. 4 and 5. A fabric sample 320 is shown in an inflated condition which it will assume under test. A collimated light source 322 is so positioned as to project a shadow outline 324 of the inflated test sample upon a translucent viewing screen 326. By rotating the test chamber 328 about its vertical axis the profile of the inflated test sample may be viewed from any desired angle. The observed profiles may be recorded by sketching around the shadow outline 324 on suitable translucent paper or other chart material (not shown). Alternatively the screen 326 may have drawn thereon typical outlines for optical comparison with a projected shadow outline of a sample under test. As noted above the optical information presented by the apparatus shown in FIG. 14 may be used along or in conjunction with the information recorded on other charts, such as those illustrated in FIGS. 1 and 9.

The optical information supplied by the device shown in FIG. 14 is particularly useful in connection with elastic fabrics which have differing stretch characteristics in different directions and where the particular shape assumed by the fabric under known conditions is important to the ultimate user of the fabric or a product such as a garment made therefrom.

While the test samples 10, 10A and 10B as well as the diaphragm 74, for example, have been shown as circular in overall outline it will be recognized that it is important only that the area of the test sample and/or diaphragm which is to be inflated for testing be circular or at least have a smoothly curved outline, e.g. oval or elliptical. Thus, the clamping rings such as 8 and 9 in FIG. 1 and the insert rings such as 102 and 109 (see FIG. 6) are annular bodies which serve to immobilize annular areas of the test sample and diaphragm and to leave circular areas thereof free to expand when test pressure is applied. Accordingly the test samples, in particular, or the diaphragms used herein may be rectangular, square, or of any other desired overall outline. Also, the end portion of fabric in a bolt may be tested without removing it from the bolt. By using rectangular test samples, the circular portions thereof subjected to testing may remain somewhat distorted and bulge upwardly away from the plane of the remainder of the sample piece, thereby giving a visible indication of the extend and persistence of permanent deformation suffered by the test area of the sample. Obviously the same considerations would apply when the test sample area is noncircular but smoothly curved in outline. Circular and other smoothly curved outlines will be defined in the claims as "substantially circular" and the surrounding immobilized areas will be defined as "substantially annular."

When the fabric or other sheet material to be tested is one which is subjected to localized stresses such as being required to conform to some irregularly shaped object, having relatively sharp corners or the like, the contour of the test area in the present apparatus may be so selected as to simulate such stresses. For example, instead of being smooth and substantially circular the test area established by the inner periphery of the insert rings 102 and 109 (see FIG. 5) may be square, rectangular or of other shape as required.

When the fabric or other sheet material is one in which bagging characteristics are important, for example papermakers felts or other industrial felts, the test sample may be inflated on the present apparatus to a predetermined pressure and the test chamber may be closed off so that no air or hydraulic liquid may escape. The sample may be held under these conditions for as many hours as may be appropriate and the progressive creep or fiber slippage which may occur may be assessed on the basis of the consequent drop in pressure within the chamber. Also, after deflation, the permanent deformation of the sample may be observed and assessed.

In he use of the apparatus of the present invention for fabrics or other sheet material of various types the elastomeric material for the diaphragm 74 may be selected on the basis of known characteristics so that the force required to inflate the diaphragm along will not dominate or obscure the test results. For example a relatively thin easily stretched elastomeric diaphragm material should be used for testing of light, highly stretchable elastic fabrics while a much heavier and stronger elastomeric diaphragm might be used when the device is employed in the testing of bagging characteristics of felts or the bursting strength of paper or paperboard. In any particular case the stretch characteristics of the elastomeric diaphragm 74 alone will be checked by inflating the same on the present apparatus so that the characteristics thereof may be taken into account when that diaphragm is used for testing of a sheet material. When the sheet material being tested is substantially nonporous the diaphragm 74 may be used or not as preferred.

As noted above it is preferred to trap a certain amount of air above the hydraulic liquid in the test chamber such as chamber 3 in FIG. 1. Preferably the quantity of trapped air is sufficient to assure that the hydraulic liquid will not would into contact with the inner surface of the sample or of the diaphragm 74. This preference is not critical when the diaphragm and test sample at maximum inflation assumes a shape such as shown in FIG. 1 which is substantially a segment of a sphere and is less than half a sphere. However, when the inflated diaphragm and test sample assume a shape such as shown in FIG. 14, e.g. more than half a sphere, the weight of any liquid which might enter such a shape would rest upon the reentrantly curved portions thereof and would introduce another variable which would make analysis of the test sample difficult.

In the use of the testing device of the present invention any of several routines may be adopted as will be evident. For example for testing samples of a particular type of material the pressure may be brought to a standard point so that the force is a constant and the test material is analyzed on the basis of elongation. Conversely the elongation (or volume) may be brought to a predetermined constant level for each sample and the test material is analyzed on the basis of the pressure (or force) required to achieve such elongation. In either case successive lots of a material required to meet certain established standards may be rapidly and routinely tested by standardized procedure appropriate for that material. Other characteristics such as fatigue or bagging under repeated changes in stress may be tested and appropriate test procedures and standards may be set up by equipping the apparatus of the present invention with any suitable well-known devices for automatically repeating and counting cycles of inflation and deflation.

I claim:

1. In a device for testing characteristics such as stretch, bagging and the bursting strength of sheet material, the combination of a chamber having an opening of predetermined shape, means for securing a sample of sheet material to be tested to said chamber in such manner as to extend across and form a substantially fluidtight closure of said opening, means for supplying a fluid under pressure to said chamber to inflate said sample thereby applying to said sample forces tending to stretch said sample in all directions, and means for displaying in intelligible form the manner in which said sample responds to the forces thus applied said last-named means comprising means for displaying in linear measure the amount by which said sample elongates in at least one direction along the surface of the sample.

2. A device in accordance with claim 1 in which said means for displaying the manner in which said sample responds includes means for displaying the changes in volume of said fluid under pressure incident to said inflation of said sample, and means for displaying the changes in pressure upon said fluid incident to said inflation.

3. A device in accordance with claim 2 in which said fluid under pressure is a gaseous fluid.

4. A device in accordance with claim 2 in which said means for displaying the manner in which said sample responds further includes means for displaying the amounts by which said sample elongates in at least two directions which intersect substantially at right angles.

5. A device in accordance with claim 2 in which said means for displaying the manner in which said sample responds comprising a substantially planar platen, means for mounting a chart on said platen, means actuated in predetermined relation with said changes in pressure upon said fluid for moving said platen with said chart in the plane of said platen, a marking device, means for mounting said marking device in constant contact with said chart upon said platen, and means actuated in predetermined relation with said changes in volume of said fluid under pressure for moving said marking device in the plane of said platen to form a permanent record upon said chart of said changes in pressure and volume.

6. A device in accordance with claim 1 in which said means for displaying the manner in which said sample responds includes means for displaying the amounts by which said sample elongates in at least two directions which intersect substantially at right angles.

7. A device in accordance with claim 1 in which said means for displaying the manner in which said sample responds comprises a platen, means for mounting a chart on said platen, a marking device, means for mounting said marking device in constant contact with said chart upon said platen, and means actuated in predetermined relation with the response of said sample for causing relative movement between said platen and said marking device to form a permanent record of said response upon said chart.

8. In a device for testing characteristics such as stretch, bagging and the bursting strength of sheets materials, the combination of a diaphragm made of elastomeric sheet material of known characteristics, means for securing a sample of sheet material to be tested in face-to-face relation with one surface of said diaphragm, said securing means comprising clamping devices for immobilizing closed peripheral areas surrounding superimposed areas of said sample and of said diaphragm, means for supplying a fluid under pressure to the surrounded area of the opposite surface of said diaphragm to cause said diaphragm to inflate thereby applying to said sample forces tending to stretch said sample in all directions, and means for displaying in intelligible form the manner in which said sample responds to the forces thus applied, said last-named means comprising means for displaying in linear measure the amount by which said sample elongates in at least one direction along the surface of the sample.

9. A device in accordance with claim 8 in which said means for displaying the manner in which said sample responds includes a wire having one end fixed with relation to a point within the immobilized peripheral areas of said diaphragm and said sample, said wire extending from said point in a line across the surrounded area of said sample, guide means with respect to which said wire is free to move lengthwise only, said guide means being fixed with relation to another point within the immobilized peripheral areas of said diaphragm and said sample whereby upon inflation of said diaphragm and consequent stretching of said sample said wire will be displaced with said sample and will be drawn through said guide means, and means connected with said wire to be moved thereby a distance related to the length of wire thus drawn through said guide means whereby to display the elongation of said sample along the line in which said wire extends thereacross.

10. A device in accordance with claim 9 in which said closed peripheral areas immobilized by said clamping devices are substantially annular, wherein said superimposed areas surrounded by said peripheral areas are substantially circular, and wherein said wire extends substantially diametrically across said superimposed ares surrounded by said peripheral areas.

11. A device in accordance with claim 8 in which said means for supplying a fluid under pressure includes a chamber containing a gaseous fluid and a hydraulic liquid and closed at the top by said diaphragm and said clamping devices, a reservoir containing a supply of hydraulic liquid, and a pump and suitable piping connecting said reservoir with said chamber, said pump being effective to force hydraulic liquid from said reservoir into said chamber to compress said gaseous fluid against said other surface of said diaphragm.

12. A device in accordance with claim 11 in which there is also provided a metering valve and suitable piping connecting said reservoir with said chamber, and a two-way valve effective in one position to permit flow of hydraulic fluid only through said pump and effective in another position to cut off said pump and permit flow of hydraulic liquid only from said chamber to said reservoir through said metering valve, whereby the response of a stretched sample to the gradual reduction of the forces applied for stretching may be displayed by the same means which serve to display the manner in which said sample responds to the application of said forces.

13. A device in accordance with claim 8 in which said closed peripheral areas immobilized by said clamping devices are substantially annular and wherein said superimposed areas surrounded by said peripheral areas are substantially circular.

UNITED STATES PATENT OFFICE
CERTIFICATE OF CORRECTION

Patent No. 3,580,050      Dated May 25, 1971

Inventor(s) Paul H. R. Waldron

It is certified that error appears in the above-identified patent and that said Letters Patent are hereby corrected as shown below:

| | |
|---|---|
| Abstract - line 9 | "dimension" should be --dimensional-- |
| Col. 1, line 67 | "of" should be --the-- |
| Col. 2, line 15 | "center test" should be --securing a test-- |
| Col. 2, line 16 | "collars" should be --and-- |
| Col. 2, line 30 | "amber" should be --chamber-- |
| Col. 2, line 58 | before "falls" insert --or-- |
| Col. 2, line 61 | "actuation" should be --actuating-- |
| Col. 2, line 64 | "bearings" should be --bearing-- |
| Col. 3, line 62 | piping "5" should be --52-- |
| Col. 3, line 75 | "along" should be --alone-- |
| Col. 4, line 10 | "in" should be --is-- |
| Col. 4, line 21 | before "locking" insert --a-- |
| Col. 4, line 27 | "rig" should be --ring-- |
| Col. 4, line 28 | "ground" should be --group-- |
| Col. 4, line 38 | "rig" should be --ring-- |
| Col. 4, line 54 | "of" should be --in-- |

UNITED STATES PATENT OFFICE
CERTIFICATE OF CORRECTION

Patent No. 3,580,050          Dated May 25, 1971

Inventor(s) Paul H. R. Waldron      PAGE - 2

It is certified that error appears in the above-identified patent and that said Letters Patent are hereby corrected as shown below:

| | |
|---|---|
| Col. 5, line 5 | "he" should be --the-- |
| Col. 5, line 9 | after "shown" insert --in Fig. 4 to the position shown-- |
| Col. 5, line 10 | "purpose" should be --purposes-- |
| Col. 5, line 18 | before "as" insert --1-- |
| Col. 5, line 43 | "to" should be --the-- |
| Col. 5, line 45 | "HOwever" should be --However-- |
| Col. 5, line 49 | "to" should be --the-- |
| Col. 5, line 65 | "in" should be --is-- |
| Col. 5, line 65 | "shown" should be --show-- |
| Col. 6, line 8 | "laten" should be --platen-- |
| Col. 6, line 11 | "to" should be --two-- |
| Col. 6, line 13 | "light" should be --right-- |
| Col. 6, line 14 | "at" delete second occurrence |
| Col. 6, line 20 | "o" should be --of-- |
| Col. 7, line 13 | "lever" should be --level-- |
| Col. 7, line 57 | "in" should be --at-- |

UNITED STATES PATENT OFFICE
CERTIFICATE OF CORRECTION

Patent No. 3,580,050      Dated May 25, 1971

Inventor(s) Paul H. R. Waldron      PAGE - 3

It is certified that error appears in the above-identified patent and that said Letters Patent are hereby corrected as shown below:

| | |
|---|---|
| Col. 7, line 57 | "or" should be --of-- |
| Col. 8, line 2 | "non-stretching" should be --non-stretchable-- |
| Col. 8, Line 51 | before "within" insert --axis-- |
| Col. 8, line 71 | "along" should be --alone-- |
| Col. 9, line 24 | "extend" should be --extent-- |
| Col. 9, line 53 | "he" should be --the-- |
| Col. 9, line 57 | "along" should be --alone-- |
| Col. 9, line 73 | "would" should be --come-- |
| Col. 10, line 35 Claim 1 | "fluidtight" should be --fluid-tight-- |
| Col. 11, line 11 Claim 8 | "sheets" should be --sheet-- |

Signed and sealed this 11th day of January 1972.

(SEAL)
Attest:

EDWARD M. FLETCHER, JR.      ROBERT GOTTSCHALK
Attesting Officer      Acting Commissioner of Patents